United States Patent [19]

Johnson et al.

[11] 4,257,171

[45] Mar. 24, 1981

[54] FLUIDIZED BED GAS DISTRIBUTOR SYSTEM

[75] Inventors: William B. Johnson, Woods Hole; Richard C. Norton, Boston, both of Mass.

[73] Assignee: Stone & Webster Engineering Corp., Boston, Mass.

[21] Appl. No.: 57,645

[22] Filed: Jul. 16, 1979

[51] Int. Cl.³ .................... F26B 17/00; F27B 15/00
[52] U.S. Cl. ........................... 34/57 A; 34/10; 432/15; 432/58
[58] Field of Search ............ 34/10, 57 A, 57 R; 432/15, 58

[56] References Cited

U.S. PATENT DOCUMENTS

| | | | |
|---|---|---|---|
| 2,639,973 | 5/1953 | Fritz | 34/10 |
| 2,662,813 | 12/1953 | Packie | 432/58 |
| 3,494,046 | 2/1970 | Harkreader | 34/10 |
| 3,746,516 | 7/1973 | Michaud | 432/58 |
| 3,796,551 | 3/1974 | Pope | 34/10 |
| 3,982,900 | 9/1976 | Malgarini et al. | 34/57 A |
| 4,090,852 | 5/1978 | Dowd | 34/10 |

Primary Examiner—John J. Camby
Attorney, Agent, or Firm—Morgan, Finnegan, Pine, Foley & Lee

[57] ABSTRACT

The apparatus of the present invention is a gas distributor system for installation beneath a fluidized bed, said distributor system containing a sift trap chamber for accumulating solids filtering through the distributor plate gas inlet means. The apparatus contains no internal parts in direct contact with the fluidized bed, and thereby limits erosion of the distributor thus reducing greatly the cost of fabrication and maintenance.

23 Claims, 8 Drawing Figures

FLUIDIZED BED GAS DISTRIBUTOR SYSTEM

BACKGROUND OF INVENTION

In fluidization processes particulate solids are maintained in a percolating or ebullating state by air or other process gas distributed evenly over the bottom of the fluidized bed chamber. Such chambers are utilized in a variety of processes including combustion, reaction, mixing and heat transfer applications. A wide range of processing environments can be encountered, specifically high temperature, erosive and corrosive conditions.

Prior art distributors include perforated plates, spargers and perforated plates with covers or bubble caps placed atop the perforations. Each of these distributors is in direct contact with the processing environment, and is subjected not only to temperature and corrosion, but also to erosion by solids during operation of the process. Perforated plates do not have internal surfaces as do bubble cap plates and spargers, and, thus, are the least expensive to fabricate, install and maintain. However, when the fluidization gas flow is stopped, the fluidized particulate solids settle onto the perforated plate, said plate allowing particulate solids to filter or sift through said perforations thereby subjecting the lower portions of the fluidization vessel to the temperature and possibly corrosive conditions in the fluidization chamber. Furthermore, filtered solids must be removed and returned to the bed chamber to reduce loss and prevent maloperation on start-up.

Bubble cap plates and spargers prevent this downward solids filtering, but are immersed in the solids during operation and must be fabricated from materials that can withstand the processing environment. Typically, replacement of the sparger or caps is required on a regular basis.

SUMMARY OF INVENTION

It is an object of this invention to distribute fluidization gas evenly to a fluidized bed chamber without solids loss upon termination of gas flow.

It is a further object to prevent solids from entering a plenum chamber below the distributor system of the present invention.

Another object of this invention is to transport retained solids that accumulate in a chamber between the plenum and fluidized bed chambers back to the fluidized bed chamber when gas flow is resumed.

An additional object of this apparatus is to thermally isolate the lower section of the fluidization vessel from hot solids during normal operation and shutdown when the apparatus is used in high temperature fluidization processes.

These and other objects of this invention will be apparent from an inspection of the specification, drawings, and the claims.

The apparatus of the present invention is a gas distributor system designed to introduce fluidization gas evenly from a plenum chamber or other gas source to a fluidized bed chamber, and to prevent bed solids from entering the plenum chamber or gas source when gas flow is terminated. Solids which filter downwardly through holes or perforations in the distributor plate are retained in an intermediate chamber formed between the distributor plate and the base plate and are prevented from further downward movement by cover means placed over the holes in the base plate. The cover means are formed with openings to allow gas flowing from the plenum chamber through the base plate holes, to flow to the intermediate chamber, and thence to the fluidized bed chamber via the holes in the distributor plate. Upon resumption of gas flow, the solids in the intermediate chamber are transported pneumatically back to the fluidized bed chamber. In one embodiment of the apparatus specifically designed for high temperature fluidization processes, the distributor also serves to thermally isolate the plenum chamber section of the fluidization vessel from heat contained by the solids in the fluidization chamber section. Thus, the processor now has the option of an alternative distributor/sift trap assembly which is not subject to the problems of the prior art.

DESCRIPTION OF DRAWINGS

The description of invention which follows refers to and incorporates the following drawing figures. All common elements in each figure have the same number designation unless a particular element is a specific embodiment that is to be distinguished from the general class of that element.

DESCRIPTION OF THE INVENTION

Figure 1:
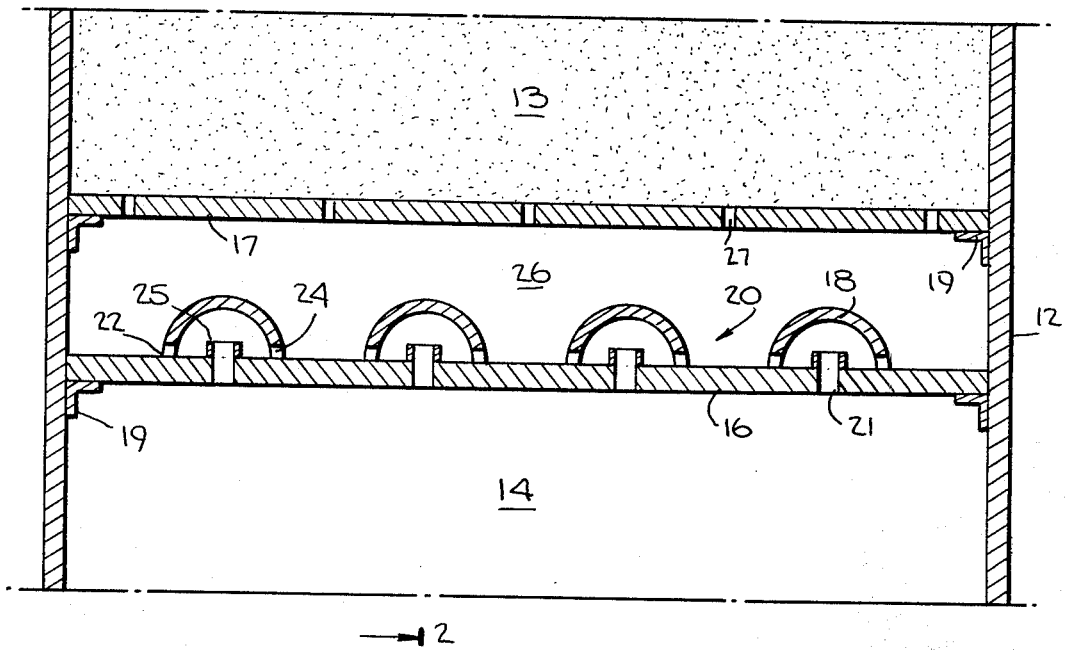
FIG. 1 is a cross sectional elevational view of the distributor system as installed in a typical fluidization vessel.

FIG. 1 shows an embodiment of the gas distributor installed in a typical fluidization vessel 12, said vessel having fluidized bed chamber 13 and plenum chamber 14 above and below the distributor system, respectively. The distributor lies transverse to the cross section of the vessel 12 and supports bed solids contained in chamber 13.

The gas distributor is comprised of three primary elements: base or understructure 16, distributor plate or partition 17 having a plurality of holes 27, and one or more cover means 18. The apparatus also includes means for attaching the cover means 18 to the understructure 16, and means for supporting the distributor plate above the cover means-understructure assembly.

Figure 3:
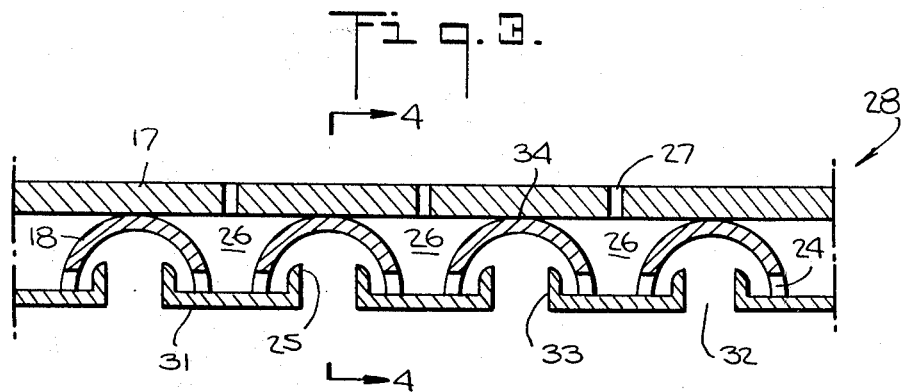
FIG. 3 is a typical section of an alternate embodiment of the distributor system wherein the distributor plate is supported by the half pipe section cover means, the cover means being fastened to an understructure comprised of a plurality of U-channels to form a unitary assembly.

The understructure 16 is commonly a base plate having a plurality of holes, perforations or similar apertures 21, said total aperture area being large in relation to the total area of holes 27 in distributor plate 17. Sleeves, weirs or other similar means preferably surround the perimeters of apertures 21 to provide a raised lip 25 above the base plate 16 which prevents solids from sifting or filtering downwardly through the apertures 21 into the plenum chamber 14. Alternatively (FIG. 3), the understructure 16 may be comprised of rectangular panels or strips arranged across the vessel cross section in spaced relationship to define longitudinally extending openings functionally equivalent to the apertures 21, and onto which the cover means 18 are attached.. This embodiment is shown in FIG. 3 and will be described in greater detail below.

Referring again to FIG. 1, the cover means 18 may be categorized as covers, caps, lids and the like. One or more of said cover means 18 is fastened atop base plate 16, each cover means covering at least one but preferably a plurality of holes 21 to form assembly 20 comprised of base plate 16 and cover means 18. Gas distribution plate or partition 17 is then located above the cover means, and forms with assembly 20 a solids retention chamber 26.

Figure 6:
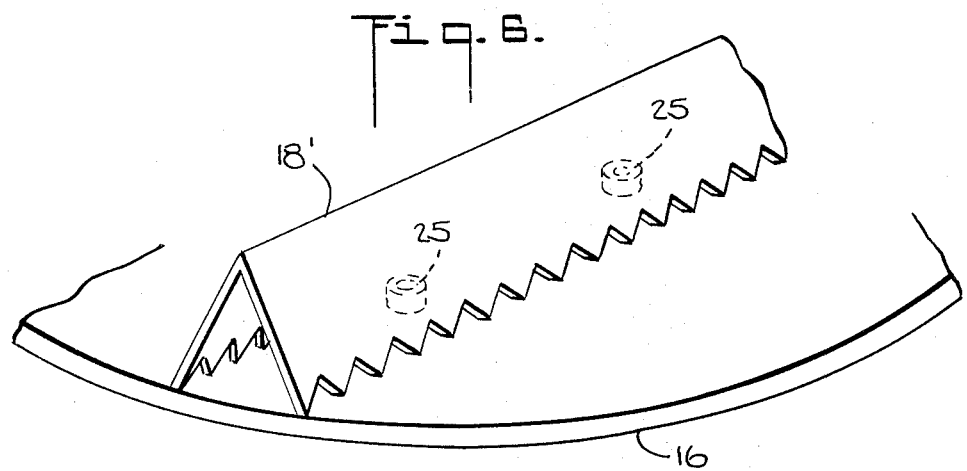
FIG. 6 is a section of the base plate showing the use of inverted V shape caps as cover means.
Figure 7:
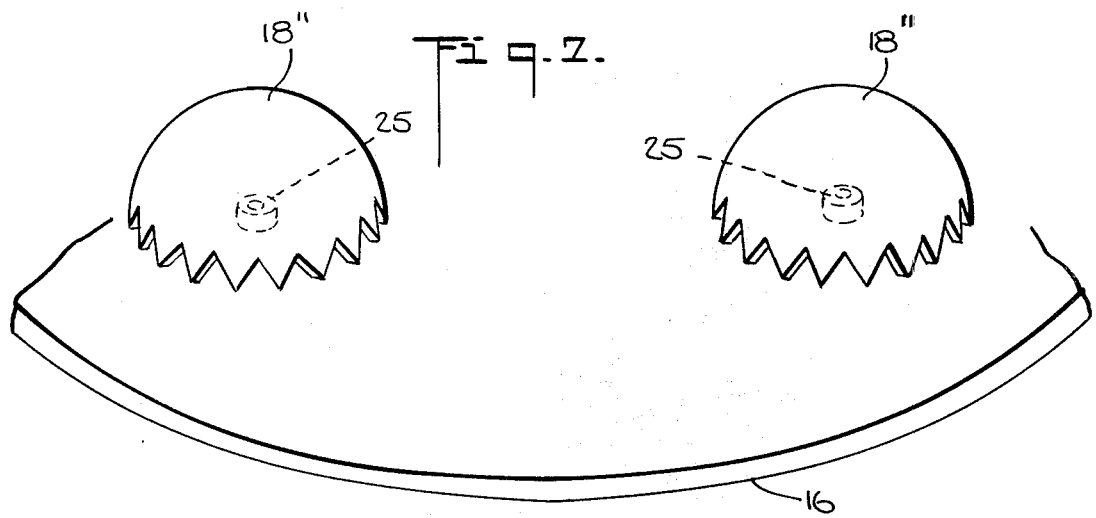
FIG. 7 is a section of the base plate showing the use of circular caps as cover means.
Figure 8:
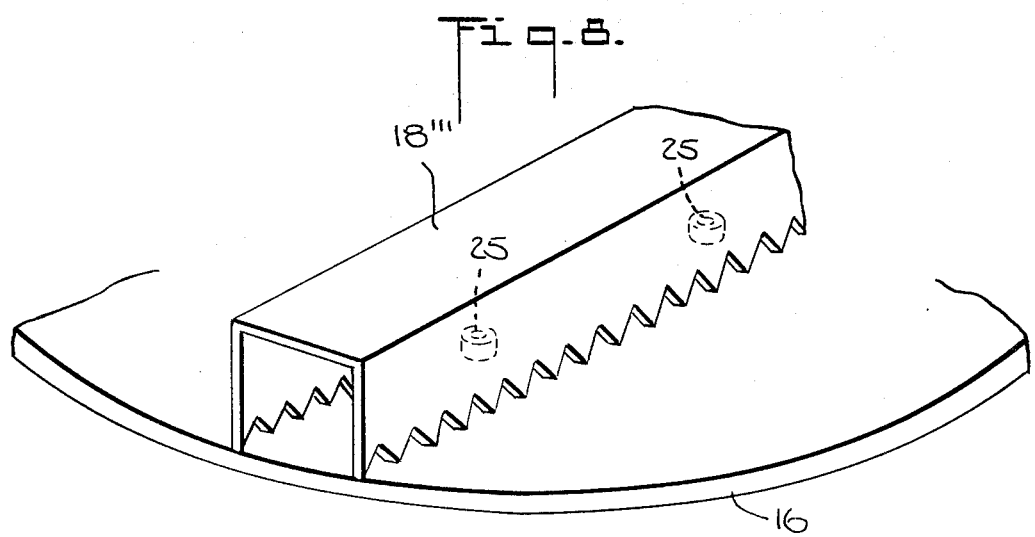
FIG. 8 is a section of the base plate showing the use of square caps as cover means.

For economy and ease of fabrication, it is preferred to use half pipe sections as the cover means as shown, although covers having any convenient shape may be used. For example, FIGS. 6, 7 and 8 are sections of the base plate 16 wherein the covers or caps 18', 18" and 18''' have respectively an inverted v, circular, or square shape. The cover means 18 may be fabricated from any suitable metal such as iron, steel, the stainless steel alloys, and aluminum. Alternatively, non-metallic materials such as ceramics may be used to fabricate the cover means.

Figure 2:
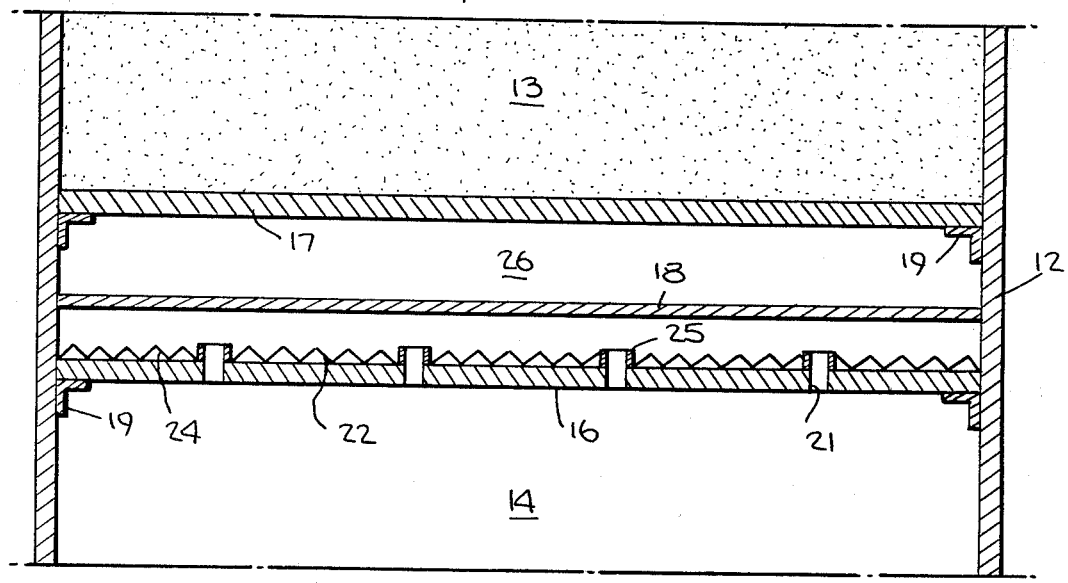
FIG. 2 is a cutaway view of FIG. 1 along Section 2—2.

The preferred half pipe or semi-cylindrically shaped cover means 18 are formed preferably with serrated longitudinal edges 22 which define openings 24 as shown in FIG. 2, the supporting parts of said edges being fastened to the base plate 16. These edges 22 straddle and isolate a plurality of holes 21 from the remainder of the distributor system. The openings 24 located proximate to and along edges 22 allow gas from holes 21 to pass through the cover means to the intermediate chamber 26, said chamber formed between the gas distribution plate 17 and the assembly 20. These edges 22 need not be serrated, however, in which case the openings 24 may be holes contained in the covers or alternatively may be a space formed between the edges and the base plate. The latter embodiment is obtained by raising the cover means from the plate and using spacers, brackets or similar attachment means to maintain the openings 24.

Plate 17 may be a deck made from any suitable material such as iron, steel, firebrick, and the like, said deck having a plurality of holes, perforations or apertures 27 aligned symmetrically and sized for the even flow of gas to chamber 13. While a steel perforated plate is preferred for many uses, other materials such as ceramic, stainless alloys, monel and hastalloy may be used directly or as a lining to resist corrosive, erosive, and high temperature environments.

It is not necessary that plate 17 be fastened to the assembly 20 comprised of base plate 16 and cover means 18, and can be attached to the walls of vessel 12 by conventional means 19 as shown in FIG. 1. Similar means 19 are employed to attach the cover means-base plate assembly 20 to vessel 12. Preferably, plate 17 is placed on top of cover means 18 and is affixed thereto forming a unitary distributor assembly 28 shown in FIG. 3. This embodiment minimizes the height of the fluidization vessel, and reduces the volume of chambers 26 wherein solids accumulate. The entire unitary assembly 28 can then be attached to the vessel 12 shown in FIG. 1 by conventional means 19 located along the perimeter of plate 16. Alternatively, plate 17 can be affixed directly to understructure 16 by brackets or other means. When plate 17 is affixed directly to the half pipe cover means 18, which extend the length of the vessel cross section, it is apparent that multiple intermediate chambers will be formed as shown in FIG. 3.

Figure 4:
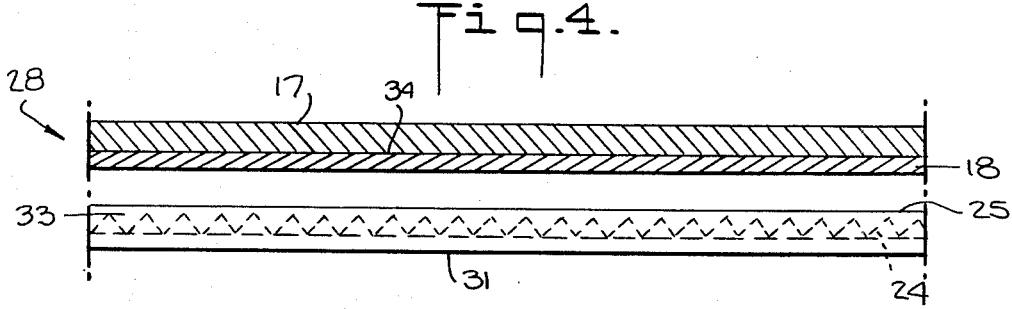
FIG. 4 is a cutaway view of FIG. 3 along Section 4—4.

FIG. 3 demonstrates the use of rectangular panels or strips in forming the understructure. A plurality of U-channels 31 have been used, although flat rectangular strips or other structural shapes can also be used. The channels 31 lie transverse to the vessel cross section, and are spaced apart from one another to form slots 32, which extend along the entire cross section of the vessel. The U-channels are oriented so that sides 33 extend upwardly, said sides forming a raised lip 25. The use of channels in lieu of perforated deck 16 obviates the need for the construction of lip 25, channel sides 33 serving as the functional equivalent of lip 25. The half pipe sections 18 are fastened to adjacent channels and straddle slots 32 and sides 33. Holes 24 in the half pipe sections have been described above. It is preferred that the height of the lip created by sides 33 be greater than the height of the holes 24 so that solids entering these holes will not filter through the slots 32. Plate 17 is fastened to the half pipe sections 18 along lines of contact 34 shown in FIG. 4 thereby forming multiple chambers 26 in which solids accumulate upon stoppage of gas flow. Welding is the preferred fastening method when the materials of plate 17 and half pipes 18 permit it. The entire assembly is supported in vessel 12 by attaching channels 31 by support means 19 as in FIG. 1.

Because of their geometric shape, the half pipe sections are usually the strongest element of this assembly, and provide the support for either of the assemblies 20 or 28 across the open vessel cross section. Thus, the half pipe cover means are preferred, and allow the channels (or base plate) and distribution plate to be fabricated from light gauge materials.

Figure 5:
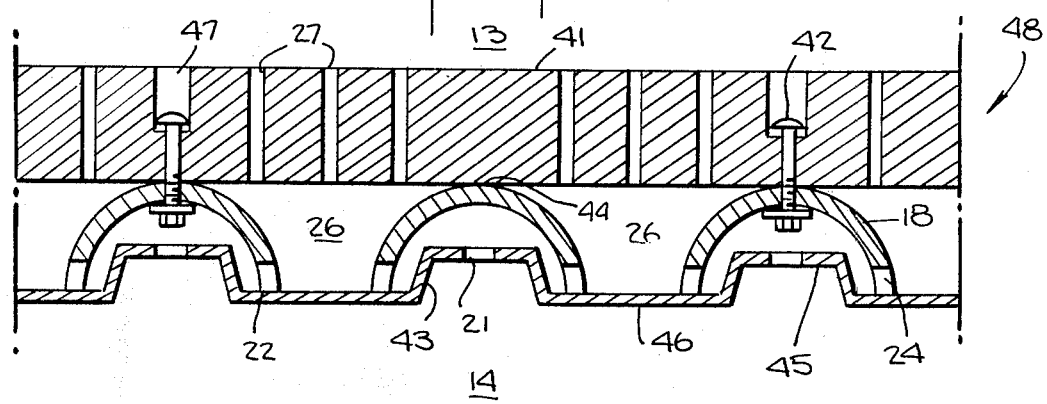
FIG. 5 is a typical section of an alternate embodiment of the distributor suitable for use in high temperature fluidization processes.

FIG. 5 is an alternate embodiment 48 showing a cored firebrick distributor partition 41 for use in high temperature fluidization processes such as a fluidized bed combustion process. The distributor partition 41 is supported directly by half pipe sections 18 along contact lines 44, and restrained from uplift by holddown bolt assemblies 42. Holes 47 permit easy removal of bolt assemblies 42, and may be filled with an easily removeable insulation material. The base plate 43 in this illustration is a lightweight corrugated plate having alternating upper sections 45 and lower sections 46. An example of such plate is a Q-panel manufactured by H. H. Robertson Company. Each half pipe cover means 18 straddles an upper section 45, and is fastened to lower sections 46 adjacent to the upper section. Holes 21 in the upper sections of the corrugated plate and openings 24 in the cover means provide paths for gas flow from the plenum chamber 14 into the solids retention chambers 26 and thence into the fluidized bed chamber 13 via holes 27 in partition 41. Upon gas stoppage, either by normal or emergency shutdown, solids in chamber 13 filter through holes 27 to chamber or chambers 26, accumulating therein. Cover means 18 prevent further filtering or sifting to the plenum chamber, thereby avoiding loss of solids which are transported back to chamber 13 when gas flow is resumed.

When used with a firebrick or ceramic heat impervious insulating material as shown in FIG. 5, the invention has particular application to high temperature fluidized bed processes. During normal operation, the firebrick plate insulates the lower portion of vessel 12 including the plenum chamber 14, base plate or understructure 43 and cover means 18 from the effects of hot solids. When gas flow stops bed solids settle to the bottom of chamber 13 and begin to filter through holes 27 thereby accumulating in multiple intermediate chambers 26. The static bed of solids transfers heat to firebrick partition 42 which gradually approaches equilibrium temperature with the solids and surroundings. Heat from the distributor is transferred to the cover means at the contact points 44, but more slowly than the heat dissipated by radiation to chamber 13 and by conduction through the walls of vessel 12 to the surroundings. Solids in any of chambers 26 transfer heat by conduction to the cover means 18, said heat being rapidly dissipated by radiation from the cover means to the space thereunder. Similarly, heat transferred by conduction to the base plate 43 will be dissipated to the plenum chamber 14. The temperature increase of the cover means 18 and base plate 43 will be small relative to the temperature increase of the firebrick partition. Thus, the temperature of the solids in chamber 13 decreases at a faster rate than the temperature increase of the firebrick partition, cover means and base plate. Equilibrium temperature, when reached, is lower than the thermal limitation of the construction materials.

We claim:

1. An apparatus for distributing fluidization gas to a fluidized bed chamber within a fluidizing vessel, the apparatus comprising:
   (a) an understructure having a plurality of holes for the passage of fluidization gas;
   (b) a partition having a plurality of apertures for the passage of fluidization gas and in contact with the fluidized bed chamber, the gas being distributed evenly thereto, said partition being supported above the understructure and forming therebetween an intermediate chamber;
   (c) one or more cover means to cover each hole in the understructure, which cover means are attached to the understructure within the intermediate chamber each cover means covering one or more holes in the understructure, said cover means containing openings proximate to or along the edges thereof so that fluidization gas flowing through the holes is diverted by the cover means through the openings contained therein to the intermediate chamber before entering the fluidized bed chamber via the apertures in the partition while solids filtering through the apertures in the partition when gas flow is stopped are prevented from filtering through the void spaces in the understructure by the cover means, the solids accumulating in the intermediate chamber and returning to the fluidized bed chamber upon resumption of fluidization gas flow;
   (d) means for attaching the cover means to the understructure, and
   (e) means for supporting the partition above the understructure.

2. The apparatus of claim 1 wherein said means for supporting the partition above the understructure is the cover means, said partition being attached thereto.

3. The apparatus of claim 1 wherein said means for supporting the partition above the understructure is by attachment to the walls of the fluidizing vessel.

4. The apparatus of claim 1, 2 or 3 wherein the understructure is a plate, said holes being perforations in the plate.

5. The apparatus of claim 4 wherein the plate is characterized by a plurality of corrugations having alternating upper sections and lower sections, the perforations being located in the upper sections each upper section being covered by a cover means that extends into lower sections adjacent thereto.

6. The apparatus of claim 5 wherein the openings in the cover means are below the plane of the upper sections of the plate.

7. The apparatus of claims 1, 2 or 3 wherein the understructure comprises a plurality of rectangular panels spaced at intervals forming therebetween the holes through which fluidization gas flows each hole being covered by a cover means that is attached to panels adjacent thereto.

8. The apparatus of claim 7 wherein the rectangular panels are U-channels, said channels oriented with the U in the upward direction.

9. The apparatus of claim 1, 2 or 3 wherein the holes in the understructure are surrounded by a raised lip or weir.

10. The apparatus of claim 1 wherein the cover means have a shape selected from the configuration consisting of inverted V, circular or square.

11. The apparatus of claim 1 wherein the cover means is fabricated from a half pipe section.

12. The apparatus of claim 4 wherein the means for attaching the cover means to the understructure is welding said cover means to lower sections of the plate, each of said lower sections adjacent to the same upper section.

13. The apparatus of claim 1 wherein the caps or covers have serrated edges, said serrations forming with the surface of the understructure openings for the passage of gas through said caps.

14. The apparatus of claims 1 or 2 wherein the partition is a deck fabricated from a material selected from the group consisting of heat impervious ceramics or firebrick.

15. The apparatus of claim 14 wherein the deck is attached to the understructure cover means assembly by hold down bolts passing through the apex of the cover means, the deck superposed with said cover means.

16. In a fluidized bed vessel having a distributor plate with a plurality of holes, the vessel containing particulate solids in a fluidization chamber above the distributor plate, the improvement comprising:
   (a) an understructure located below the distribution plate, said understructure having a plurality of apertures,
   (b) a solids retention chamber defined by the bottom of the distributor plate and the top of the understructure, and
   (c) a plurality of caps or covers over all of the apertures, each of said caps or covers covering one or more apertures in the understructure, the caps or covers having a side opening for preventing the passage of particulate solids through the apertures, which enter the intermediate chamber through the holes in the distributor plate when the fluidization gas flow is interrupted from further filtering through the apertures in the understructure.

17. A distributor as in claim 16, wherein the distributor plate is supported by the caps or covers.

18. A distributor as in claim 16 wherein the covers comprise a length of half-pipe extending from one side of the solids retention chamber to the other side, said half pipes covering a plurality of aligned apertures in the understructure.

19. A distributor as in claims 16, or 18 wherein a weir encircles the apertures in the understructure, said means for preventing the passage of particulate solids also extending over said weir.

20. A distributor as in claim 18 wherein the understructure comprises a plurality of rectangular panels arranged in spaced relationship across the vessel cross section to define longitudinally extending apertures between said panels, each aperture being covered by a length of half pipe extending from one side of the solids retention chamber to the other across the vessel cross section.

21. A distributor as in claim 20 wherein the rectangular panels are U-channels, said channels oriented with the U in an upward direction.

22. A distributor as in claim 18 wherein the understructure is a corrugated plate having alternating upper and lower sections, one or more apertures being in each upper section, and each upper section being covered by a half pipe extending the length of the corrugation across the vessel cross section.

23. A distributor as in claims 18, 20, or 22 wherein the side openings are formed by serrations in said sides along the edge thereof when said serrated sides are located on the understructure.

* * * * *